United States Patent [19]

Kim et al.

[11] Patent Number: 5,795,953
[45] Date of Patent: Aug. 18, 1998

[54] SOLUBLE, ELECTROCONDUCTIVE POLYPYRROLE AND METHOD FOR PREPARING THE SAME

[75] Inventors: Chung Yup Kim; Jun Young Lee; Dong Young Kim, all of Seoul, Rep. of Korea

[73] Assignee: Korea Institute of Science and Technology, Seoul, Rep. of Korea

[21] Appl. No.: 532,131

[22] Filed: Sep. 22, 1995

[30] Foreign Application Priority Data

Jan. 19, 1995 [KR] Rep. of Korea .................. 837/1995

[51] Int. Cl.$^6$ .................................................. C08G 73/06
[52] U.S. Cl. ........................................ 528/423; 548/518
[58] Field of Search ............................. 548/518; 528/423

[56] References Cited

PUBLICATIONS

Armes, "Optimum Reaction Conditions for the Polymerization of Pyrrole by Iron (III) Chloride in Aqueous Solution", *Synthetic Metals* 20:365–371 (1987).

Rapi et al., "Conducting Polypyrrole by Chemical Synthesis in Water", *Synthetic Metals* 24:217–221 (1988).

Machida et al., "Chemical Synthesis of Highly Electronically Conductive Polypyrrole", *Synthetic Metals* 31:311–318 (1989).

Masuda et al., "Soluble Conducting Polypyrrole: Poly(3-octylpyrrole)", *J. Chem. Soc. Chem. Commun.*, 725–726 (1989).

Ko et al., "Movement of Dopants in Redox Reaction of Electro-conductive Polymers", *Makromol. Chem.* 33:353–359 (1990).

Cao et al., "Liquid-crystalline Solutions of Electrically Conducting Polyaniline", *Polymer* 34(15):3139–3143 (1993).

DeArmitt et al., "Colloidal Dispersions of Surfactant-Stabilized Polypyrrole Particles", *Am. Chem. Soc.*, 9:652–654 (1993).

Thieblemont et al., "Stability of Chemically Synthesized Polypyrrole Films", *Synthetic Metals* 59:81–96 (1993).

"Conjugated Polymers and Related Materials", ed. Salaneck et al., Oxford Univ. Press, New York, p. 92 (1993).

Maeda et al., "Preparation and Characterization of Novel Polypyrrole–Silica Colloidal Nancomposites", *J. Mater. Chem.* 4(6):935–942 (1994).

Thieblemont et al., "Polypyrrole Overoxidation During Its Chemical Synthesis", *Synthesis Metals* 66:243–247 (1994).

*Primary Examiner*—Joseph McKane
*Assistant Examiner*—Richard S. Myers
*Attorney, Agent, or Firm*—Townsend and Townsend and Crew LLP

[57] ABSTRACT

Polypyrrole represented as the following structural formula II:

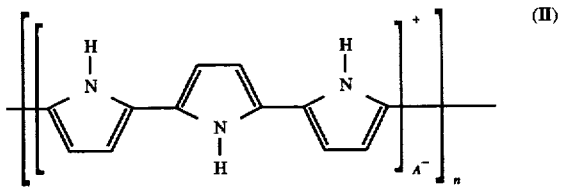

wherein A$^-$ =

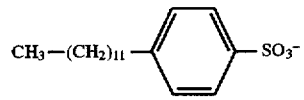

which is synthesized by a method comprising the step of polymerizing pyrrole monomer in an aqueous solution containing dodecylbenzene sulfonic acid as a dopant, in the presence of an oxidant, resulting in polypyrrole which is easily dissolved in organic solvents.

6 Claims, 2 Drawing Sheets

SOLUBLE, ELECTROCONDUCTIVE POLYPYRROLE AND METHOD FOR PREPARING THE SAME

BACKGROUND OF THE INVENTION

1. Field of the Invention

The present invention relates to electroconductive polypyrrole which is superior in solubility and thus able to be cast into films and solution-sprayed into coatings. Also, the present invention is concerned with a process for preparing soluble, electroconductive polypyrrole by polymerizing pyrrole monomers in an aqueous solution in the presence of dodecylbenzene sulfonic acid (DBSA).

2. Description of the Prior Art

Since polypyrrole is high in electroconductivity and stable in the air, it is useful for a plurality of purposes including electroconductive coating materials and paints, electrode materials for batteries, semiconductor parts, electrolytes for solid electrolytic capacitors, solar cells utilizing solar energy into electricity and so on. Accordingly, extensive research has recently been directed to the synthesis and applications of polypyrrole.

However, there are many limitations in its practical processing and application since the strong intermolecular interaction of the heterocyclic planar structure of polypyrrole makes it virtually impossible not only to dissolve polypyrrole in any solvent, but also to melt it.

Polypyrrole can be easily synthesized by electrochemical or chemical polymerization techniques.

Films of polypyrrole uniform and superior in mechanical properties can be obtained by electrochemical polymerization techniques. In these techniques, correspondingly large electrodes are necessary to obtain a polypyrrole film with a large area. In addition, it is difficult to synthesize uniformly thick films by electrochemical polymerization techniques. Further, electrochemically synthesized polypyrrole films always have bumpy (shaped like bunches of grapes) surfaces (FIG. 1A), making it difficult to control electric and electronic functions when the polypyrrole films are used as electrode materials of micro-electric devices because the distances between the electrodes are different and thus, an oversupply of current passes in certain portions.

For chemical polymerization techniques the polypyrrole is obtained as powder which is insoluble so that it alone cannot be formed into films. Polymerization of pyrrole monomer through chemical oxidation is generally accomplished by the addition of a persulfate oxidant and an acid serving as a dopant, resulting in a polypyrrole doped with the acid anion. It is also reported that a powder of polypyrrole is obtained by using $FeCl_3$ as an oxidant and 2-naphthalene sulfonic acid or p-toluene sulfonic acid as a dopant. However, the powder obtained was not dissolved in any organic solvent.

Extensive studies were made to allow processability to polypyrrole. Most of them proceed toward weakening intermolecular interaction through modifications of pyrrole monomer, so as to give the resulting polypyrrole solubility. For example, a successful example of the solubility of polypyrrole is reported in J. Chem. Soc., Chem. Commun, 11, 725, 1989), which is accomplished by attaching an alkyl group with a long chain, such as octyl, to pyrrole monomer. However, the pyrrole derivative is difficult to synthesize and costs too much compared with non-substituted pyrrole. Besides, the modified polypyrrole is very poor in electroconductivity and examples of its actual applications are indeed rare.

SUMMARY OF THE INVENTION

It is an object of the present invention to provide a soluble, electroconductive polypyrrole.

It is a further object of the present invention to provide a soluble polypyrrole which is capable of being cast into films having a very smooth surface.

It is a further object of the present invention to provide a method for preparing polypyrrole.

In accordance with one aspect of the present invention, there is provided a soluble, electroconductive polypyrrole represented as the following structural formula II:

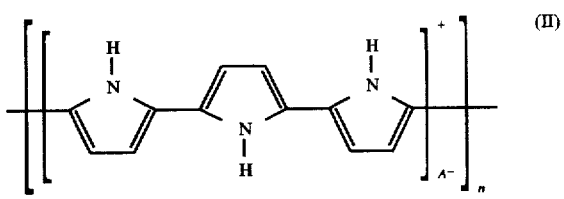

wherein $A^-$ =

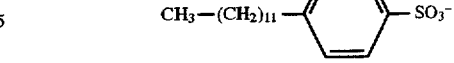

In accordance with another aspect of the present invention, there is provided a method for preparing soluble, electroconductive polypyrrole represented as the structural formula II, comprising the step of polymerizing pyrrole monomer represented as the following structural formula I:

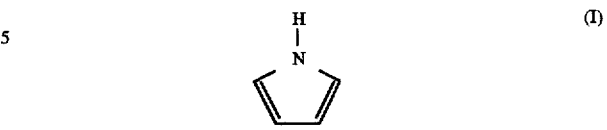

using an aqueous solution containing dodecylbenzene sulfonic acid as a dopant, in the presence of an oxidant.

DETAILED DESCRIPTION OF THE INVENTION

Figure 1A:
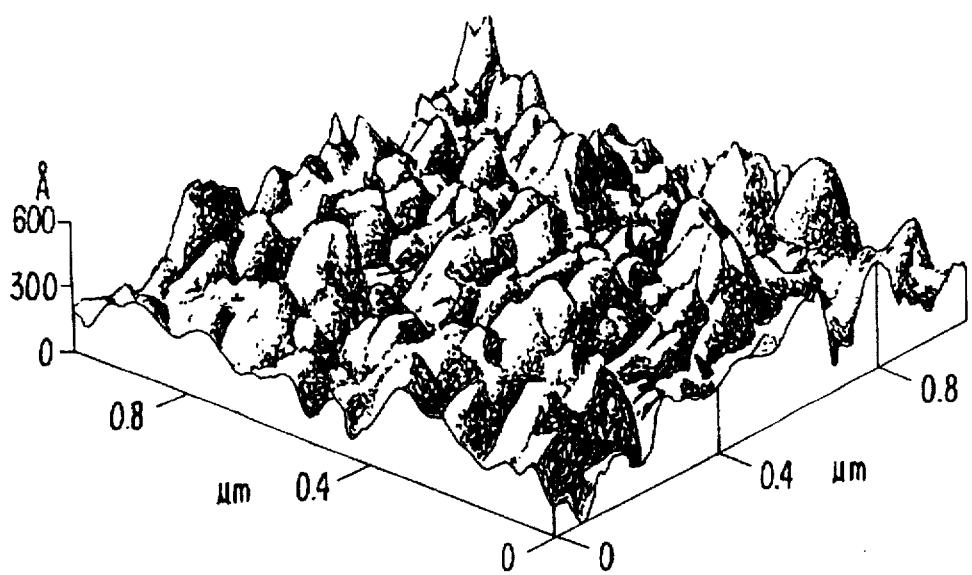
FIG. 1A is an atomic force micrograph (AFM) of a film made of electrochemically synthesized polypyrrole showing a rough surface.

The polypyrrole according to the present invention is soluble in an organic solvent, and thus it is capable of being spray-coated by virtue of its superior solubility, and is capable of being processed into conductive composites.

The soluble polypyrrole according to the present invention is capable of being cast into films having a smooth surface. Herein, the term "soluble polypyrrole" means that it can be formed into films which can have any desirable thickness and size.

The present invention provides polypyrrole represented as the following structural formula II:

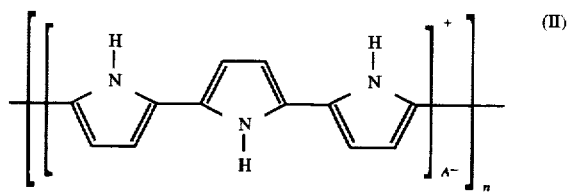

In the present polypyrrole, an anion, denoted by $A^-$, which results from the dissociation of dodecylbenzene sulfonic acid, acts as a dopant which is doped in the polymer, rendering electroconductivity to it. Since this dopant is located between the molecules of polypyrrole and has a molecular weight of about 5 times as large as a pyrrole monomer, it prevents the polypyrrole molecules from coming into direct contact with each other. Thus, the dopant greatly reduces the intermolecular interaction of polypyrrole, resulting in large improvements in the solubility of the polypyrrole. It is known to those knowledgeable in the art that one anion is doped per 3 or 4 pyrrole repeating units.

Powders of the polypyrrole according to the present invention are dissolved in weakly polar organic solvents such as dichloromethane and m-cresol and polar organic solvents such as tetrahydrofuran (THF) and dimethylformamide (DMF). Also, they could be dissolved even in chloroform provided that dodecylbenzene sulfonic acid is added at an amount of 100 to 200 weight % based on the total weight of the polypyrrole.

Gel permeation chromatography (GPC), which is generally used to measure molecular weights of polymers, is not effective for doped conductive polymers which are in an oxidation state. Further, because K and a values, necessary for the Mark-Houwink equation, are not known for polypyrrole, its molecular weight cannot be determined by measurement of inherent viscosity.

But, the intrinsic viscosity of a m-cresol solution dissolving the polypyrrole according to the present invention is about from 0.07 dl/g to 0.3 dl/g at 30° C. which is lower than that of soluble polyaniline, 0.18–2.62 dl/g as reported in Polymer 34, 3139 (1993) by Y. Cao and P. Smith.

Such low intrinsic viscosity means that the molecular weight of the soluble polypyrrole according to the present invention is not so large.

The soluble polypyrrole of the present invention is prepared by polymerizing pyrrole monomer in the presence of a persulfate oxidant. In more detail, to a solution of dodecylbenzene sulfonic acid and pyrrole monomer in distilled water, persulfate oxidant is slowly added with stirring in an incubator at a temperature of −5° to 20° C. for 24 hrs at the costant temperature. Thereafter, methanol is added to stop the polymerization. The synthesized powdery polypyrrole was filtered, washed many times with distilled water and methanol.

It is preferred that the concentration of dodecylbenzene sulfonic acid upon polymerization of pyrrole is on the order of 0.1 to 1.0 mole based on the moles of pyrrole monomer. A concentration departing from the range results in undesirable solubility of polypyrrole.

As the persulfate oxidant, potassium persulfate or ammonium persulfate is used in the present invention with a preference to ammonium persulfate. The persulfate oxidant is added preferably at 0.1–0.5 mole per unit mole of pyrrole monomer and more preferably at 0.1–0.2 mole per unit mole of pyrrole monomer. As the concentration increases within this range, the conductivity of the film obtained by casting and the production yield increase while the solubility thereof decreases. If the mole ratio of the persulfate oxidant to pyrrole monomer is above 0.5, the solubility markedly decreases. On the other hand, if the mole ratio is less than 0.1, the conductivity of a cast film drops into less than $10^{-6}$ S/cm while the solubility is improved.

Figure 1B:
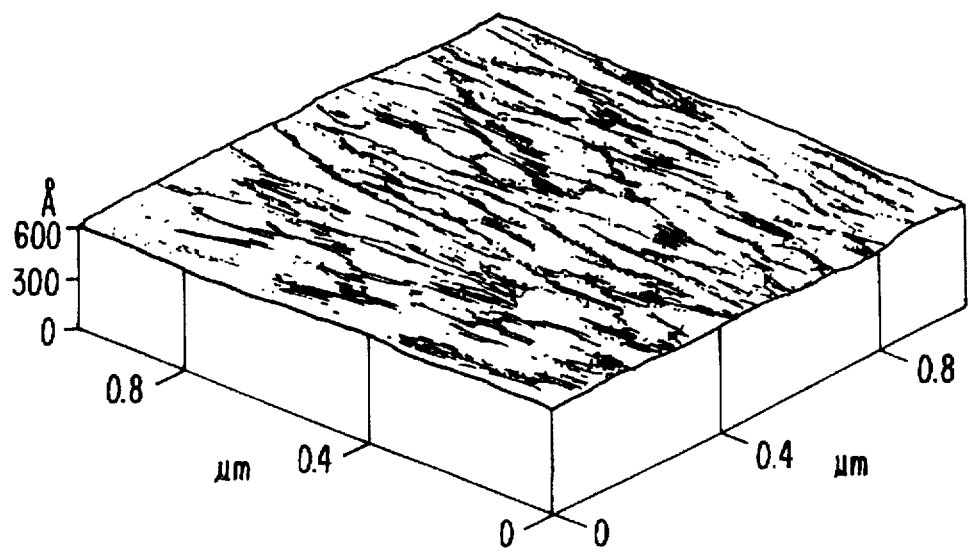
FIG. 1B is an atomic force micrograph (AFM) of a film made by casting the polypyrrole according to the production method of the present invention, showing a smooth surface.

In contrast with the electrochemically polymerized polypyrrole film having a bumpy surface as shown in FIG. 1A, the polypyrrole prepared according to the method of the present invention, when a film is formed by casting a solution that the present polypyrrole is dissolved in an organic solvent, has a smooth surface without any bumps, as shown in FIG. 1B. From this fact, it is apparent that a smooth surface with a good electroconductivity can be obtained when the soluble electroconductive polypyrrole prepared according to the present invention is coated on some surface. As a result, the polypyrrole of the present invention can be more extensively used. For example, the polypyrrole film according to the present invention is completely free of surface bumps, which are seriously problematic to electrochemically polymerized polypyrrole films used as a pair of electrodes with a very small gap, and thus, can be used as excellent electrode materials that do not have differences in the distances between the electrodes.

Figure 2:
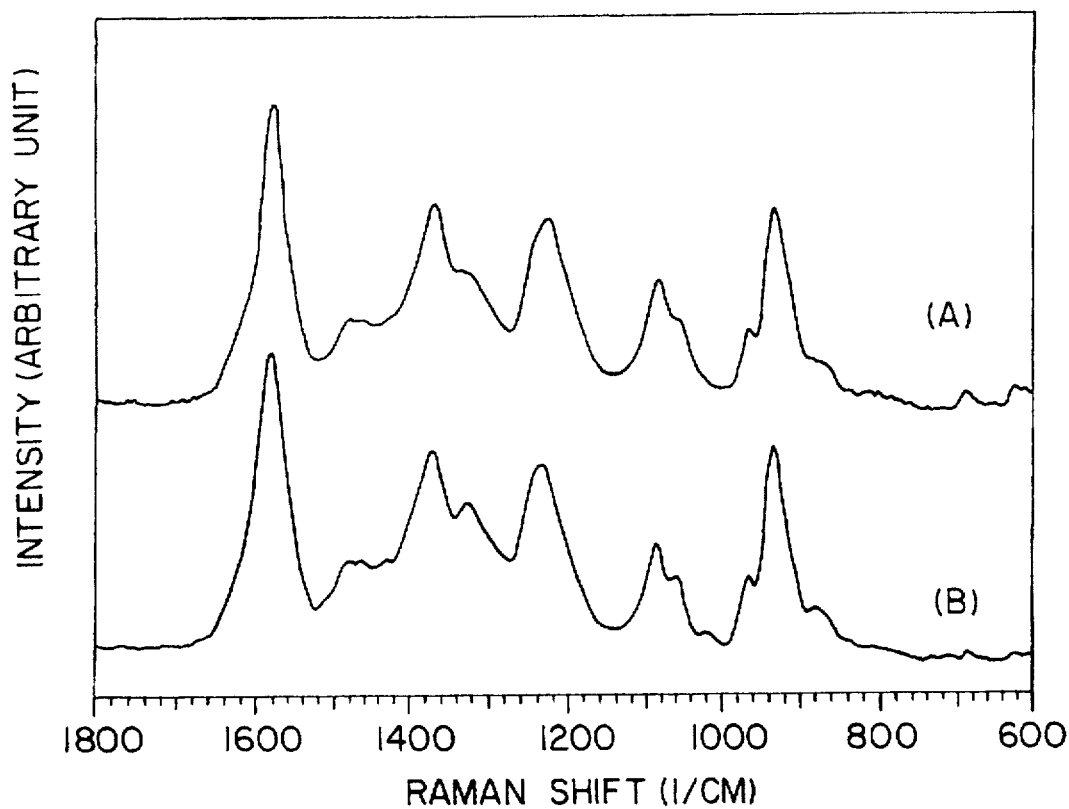
FIG. 2 shows two FT-Raman spectra for electrochemically synthesized polypyrrole (A) and the soluble polypyrrole synthesized according to the method of the present invention (B)

With reference to FIG. 2, there are shown FT-Raman spectra for a film obtained by casting the present polypyrrole solution and an electrochemically polymerized polypyrrole film. These spectra are completely the same, showing that the chemical structure of the soluble polypyrrole prepared according to the present invention is identical to that of electrochemically polymerized polypyrrole.

It is believed that one reason why the present polypyrrole is different from the electrochemically synthesized polypyrrole in solubility in spite of an identical chemical structure is that they are different from each other in molecular weight and/or crosslink density. As apparent from the solubility, the present method scarcely generates intermolecular crosslinks in polypyrrole, compared with the electrochemical polymerization method. In accordance with the present invention, the molecular weight of polypyrrole can be controlled by the concentration of the oxidant. In contrast, the polypyrrole obtained by electrochemical polymerization or chemical polymerization does not allow its molecular weight to be measured because of its absolute insolubility.

By controlling the reaction conditions including reaction temperature and concentrations of dodecylbenzene sulfonic acid and a persulfate oxidant, the solubility in organic solvents of the soluble polypyrrole obtained by the method of the present invention and the conductivity thereof can be adjusted.

The soluble polypyrrole according to the present invention is capable of being cast into films having a smooth surface.

As the surface of a conductive material is smoother, the electromagnetic functions thereof become more uniform, which allows micro-devices to be formed with high reproductivity.

In addition, when being blended with other polymeric materials in order to improve adhesiveness or strength, the conductive material with a smoother surface can be easily formed to have superior electric functions by, example, coating it on glass or polymeric film. In this case, it is possible to obtain transparent electrode plates equivalent to a transparent ITO glass plate by controlling the thickness of the polypyrrole coating.

In addition, a significance of the soluble polypyrrole according to the present invention is that it can be solution-blended with various general-purpose polymers capable of being dissolved in organic solvents, such as polystyrene (PS), amorphous nylon and poly(methylmethacrylate) (PMMA), to form conductive films with good mechanical properties.

As explained above, the electroconductive polymers obtained by the method of the present invention are easily dissolved in organic solvents, so that they show superior processability, which allows them to be applied for a wide range of uses including electroconductive coating materials and paints, electrode materials for batteries, semiconductor parts, electrolytes for solid electrolytic capacitors, solar cells utilizing solar energy as electricity and so on.

A better understanding of the present invention may be obtained in light of the following examples which are set forth to illustrate, and are not to be construed to limit, the present invention.

EXAMPLE I 24.3 g (0.0745 mol) of dodecylbenzene sulfonic acid was dissolved in 300 ml of deionized water and the solution was poured into a reactor, which was then placed in an incubator at a temperature of 5° C. 10 g (0.149 mol) of pyrrole monomer which was dried with calcium halide and distilled under reduced pressure was added to the resulting solution which was then vigorously stirred for 20 min. with a mechanical stirrer. To this solution, 3.65 g (0.016 mol) of ammonium persulfate solution in 100 ml of deionized water was added over 5 min. and reacted for 16 hrs. with stirring. The addition of 300 ml of methanol stopped the reaction and the solution was filtered to obtain a fine polypyrrole powder. The polypyrrole powder was washed with excess deionized water and methanol and filtered to give pure polypyrrole: yield 20.8%.

The solubilities of the polypyrrole in m-cresol, chloroform, THF and DMF, each, were examined and the results are given as shown in Table 1.

Using a thin disc-like specimen made by compressing the pure polypyrrole powder and a film (thickness: 100 μm) made by casting a polypyrrole solution in chloroform, voltages were detected under a constant current by the four probe method, to examine thoes conductivities, and the results are given as shown in Table 2.

As indicated in Table 1, the polypyrrole prepared according to the present invention is well dissolved in m-cresol, THF and DMF but not in chloroform. In the latter case, when dodesylbenzene sulfonic acid was further added at an amount of 50 weight % based on the weight of the polypyrrole, the polypyrrole was dissolved very well.

EXAMPLE II

Pure polypyrrole powder was prepared in a similar manner to that of Example I, except that 7.3 g (0.032 mol) of ammonium persulfate was used. Yield 63.6%.

The results of the analyses for solubility and conductivity are given as shown in Tables 1 and 2, respectively.

As indicated in Table 1, the polypyrrole prepared in this example was superior in solubility in m-cresol, THF and DMF to the polymer prepared in Example 1 but not dissolved in chloroform. In the latter case, when dodesylbenzene sulfonic acid was further added at an amount of 50 weight percent based on the weight of the polypyrrole, the polypyrrole dissolved very well. As shown in Table 2, the polypyrrole film of this example has about 700 times as high a conductivity as does that of Example I. In the case of the compressed powder, the conductivity of Example II is about 360 times as high as that of Example I. Consequently, the conductivities of the polypyrrole film and the powder of Example II are much improved relative to those of the polypyrrole film and the powder of Example I.

COMPARATIVE EXAMPLE I

Pure polypyrrole powder was prepared in a similar manner to that of Example I, except that 18.25 g (0.080 mol) of ammonium persulfate was used. Yield 87.6%.

The results of the analyses for solubility and conductivity are given as shown in Tables 1 and 2, respectively.

Although its conductivity is 14.4 S/cm, a high value when compressed, the powder is of low solubility in the organic solvents. Thus, a solution capable of being casted into films could not be obtained by using the solvents.

TABLE 1

Solubility of the Soluble Polypyrrole

| Example No. | Solvent | | | |
| --- | --- | --- | --- | --- |
| | m-Cresol | THF | DMF | Chloroform |
| Example I | CS | CS | CS | PS (CS*) |
| Example II | CS | CS | CS | PS (CS*) |
| C. Example I | PS | IS | IS | IS | note:
PS: partially soluble,
CS: completely soluble,
IS: insoluble,
CS*: completely soluble after addition of a certain amount of DBSA

TABLE 2

Conductivity of Soluble Polypyrrole Powder and Film from Chloroform Sol'n

| Example No. | Conductivity (s/cm) | |
| --- | --- | --- |
| | Compressed Powder | Film |
| Example I | $2.97 \times 10^{-3}$ | $1.25 \times 10^{-2}$ |
| Example II | 1.10 | 8.90 |
| C. Example I | 14.35 | Impossible Casting |

EXAMPLE III

The polypyrrole obtained in Example II in combination with polymethy(methacrylate), sold by Polyscience, Inc., under the designation of "IV: 1.3", was dissolved in various concentration ratios in chloroform with dodecylbenzene sulfonic acid, to give solution blends, which were then cast into films. The conductivities of these films were measured by the four probe method. The results are shown in FIG. 3.

Figure 3:
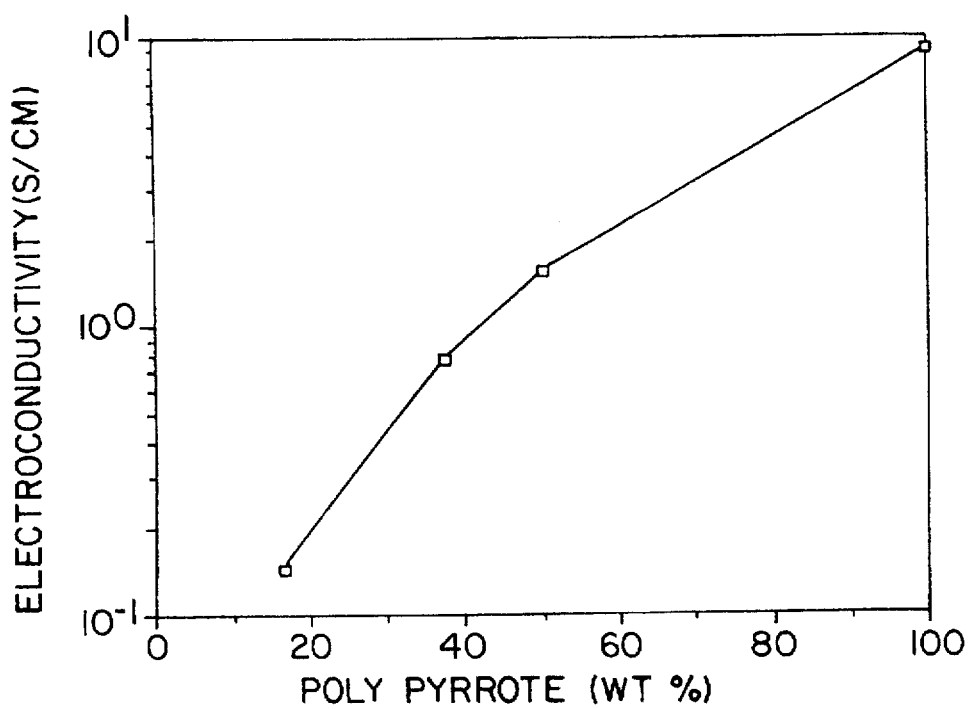
FIG. 3 is a plot of the electroconductivity of the present polypyrrole with respect to weight fractions of poly (methylmetacrylate)(PMMA) in PMMA/polypyrrole blends.

As plotted in FIG. 3, when the content of the polypyrrole is 16.7, 28.6, 37.5 and 50 weight %, the conductivity is $1.5 \times 10^{-1}$, $6.6 \times 10^{-1}$ $7.6 \times 10^{-1}$ and 1.6 S/cm, respectively, which indicates that a higher content of polypyrrole results in a higher conductivity. Besides, up to 50 weight % of polypyrrole still resulted in a film with high mechanical strengths.

Other features, advantages and embodiments of the present invention disclosed herein will be readily apparent to those exercising ordinary skill in the art after reading the foregoing disclosures. In this regard, while specific embodiments of the invention have been described in considerable detail, variations and modifications of these embodiments can be effected without departing from the spirit and scope of the invention as described and claimed.

EXAMPLE IV

The mechanical properties of a film made by casting the polypyrrole of Example II, a conventional polypyrrole (polypyrrole-DS) and a polyanyline are given as shown in the following Table 3.

TABLE 3

| Mechanical Property | Polypyrrole-DBSA*[1] | Polypyrrole-DS*[2] | unstretched*[3] Polyaniline |
|---|---|---|---|
| Tensile Strength at Break (MPa) | 17.0 | 68.5 | 54.4 |
| Elastic Modulus (MPa) | 1945 | — | — |
| Elongation at Break (MPa) | 0.9 | 7.7 | — |

*[1]: dodecylbenzene sulfonic acid,
*[2]: dodecyl sulfate ion, J. M. Ko, H. W. Rhee and C. Y. Kim, Makromol. Chem. Macromol. Symp., 33, 353–359 (1990)
*[3]: "Conjugated Polymers and Related Materials", ed. W. R. Salaneck, I. Lundström, B. Ránby, 1993, 92

As apparent from Table 3, the polypyrrole according to the present invention is comparable in mechanical properties with electrochemically synthesized polypyrrole films and cast polyaniline films.

What is claimed is:

1. A method for preparing soluble, electroconductive polypyrrole comprising the step of polymerizing pyrrole monomer in an aqueous solution containing dodecylbenzene sulfonic acid as a dopant, in the presence of about 0.05 moles to about 0.5 moles of a persulfate oxidant per mole of said pyrrole monomer to produce said soluble, electroconductive polypyrrole.

2. The method in accordance with claim 1, wherein said step of polymerizing is carried out at a temperature of about 5° C.

3. The method in accordance with claim 1, wherein said polypyrrole has an intrinsic viscosity in m-cresol from about 0.07 dl/g to 0.3 dl/g at 30° C.

4. The method in accordance with claim 1, wherein said polypyrrole is soluble in chloroform in the presence of additional dodecylbenzene sulfonic acid.

5. A method in accordance with claim 1, wherein said persulfate oxidant is ammonium persulfate or potassium persulfate.

6. The method in accordance with claim 1, wherein said dodecylbenzene sulfonic acid is added at an amount of about 0.1 to about 1.0 moles per mole of said pyrrole monomers.

* * * * *